Nov. 30, 1926.  
J. D. REIFSNYDER  
1,608,617  
MACHINE FOR ASSEMBLING CONTAINERS  
Filed July 14, 1925  5 Sheets-Sheet 5

Patented Nov. 30, 1926.

1,608,617

UNITED STATES PATENT OFFICE.

JAMES D. REIFSNYDER, OF BROOKLYN, NEW YORK, ASSIGNOR TO TULIP CONTAINER CORPORATION, OF NEW YORK, N. Y., A CORPORATION OF NEW YORK.

MACHINE FOR ASSEMBLING CONTAINERS.

Application filed July 14, 1925. Serial No. 43,538.

This invention relates to machines for assembling containers: and more particularly that form of container which consists of a shell or body member, preferably of tubular form, and a bottom or end member inserted in the lower portion of the body or shell.

An object of the invention is to provide an efficient and durable machine capable of automatically rapidly assembling containers from body and end portions made on other machines.

Before going into the details of the machine a general description will be given so that the most important features may be understood in a general way.

The bodies or shells of the containers are fed to the machine in formed condition; and the container end portions are fed to the machine in formed condition, preferably from the punch press where they are made, by any suitable means such as a belt conveyor.

The apparatus in its preferred form comprises a flexible chain conveyor carrying a plurality of receptacles adapted to hold body portions of containers. This conveyor will be referred to as the body conveyor; and means are provided for moving this conveyor intermittently to thereby bring each body, carried thereby, successively adjacent each of the three main stations, which will now be enumerated. This conveyor may be a part of the machine described in my copending U. S. application Ser. No. 746,719, filed October 30, 1924. The first station will be designated as the end inserting station; the second station as the end fixing station; and the third station as the bead forming station. Means are provided for feeding the container end portions to an adhesive applying device where adhesive is applied. After adhesive has been applied to a given end, it is picked up by a suction plunger and inserted thereby into the container then at rest adjacent station number one. The conveyor moves on and this receptacle is carried to station number two where it comes to rest, during which interval of rest two cooperating plungers radially press the juxtaposed peripheral surfaces of the end and body into a positive state of cohesion. The conveyor then moves on carrying the receptacle to station number three where it comes to rest, during which interval of rest two cooperating bead rollers form a bead adjacent the open end of the container. The conveyor now moves the finished receptacle to the discharge point, where it is discharged.

The invention consists in the novel features of construction, arrangement and combination of parts embodied, by way of example, in the apparatus hereinafter described as illustrating the preferred form of the invention, and the invention will be more particularly pointed out in the appended claims.

Further objects and advantages of the invention will more fully appear from the following description taken in connection with the accompanying drawings which show, by way of example, the present preferred embodiment of the invention.

Referring to the accompanying drawings in which the same reference characters indicate the same parts in the various views.

Figure 1:
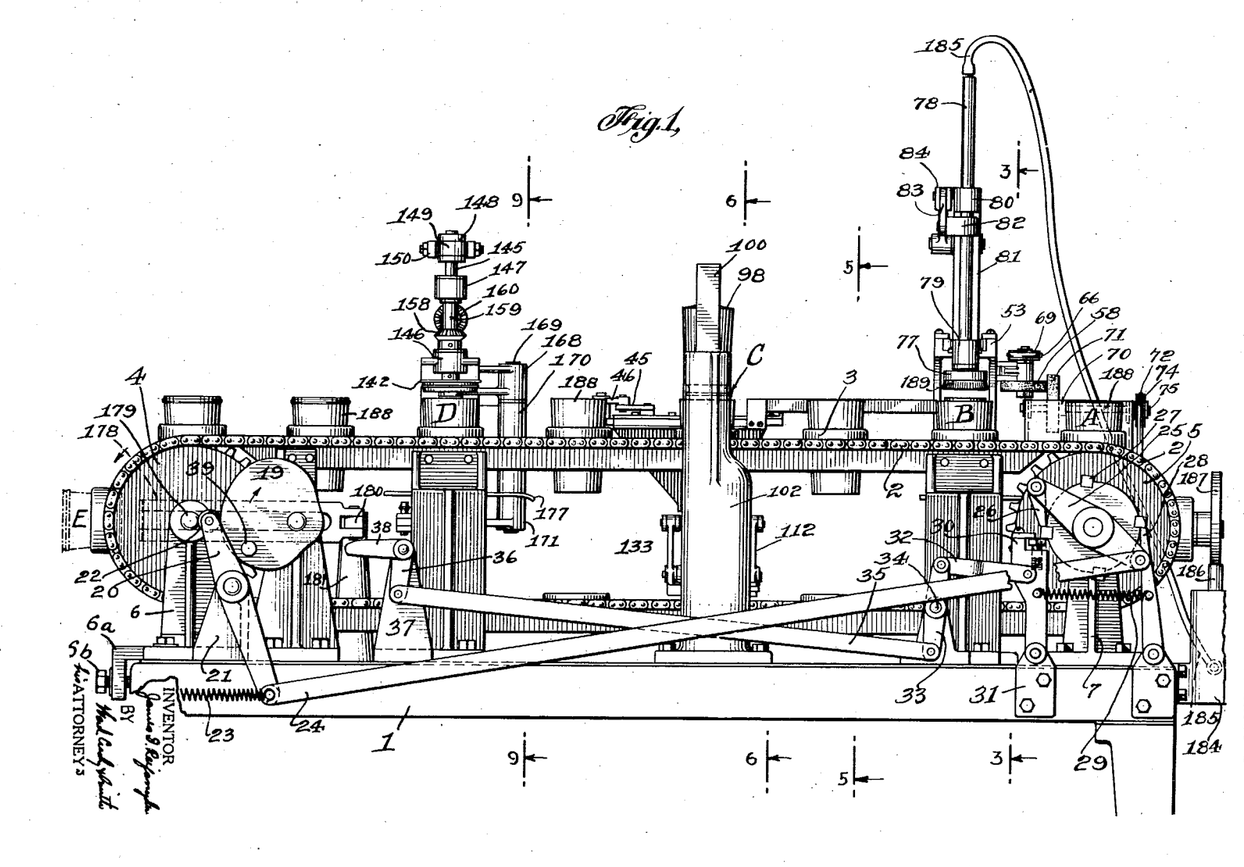
Fig. 1 is a front elevation of the machine, with certain parts omitted for clearness.
Figure 2:
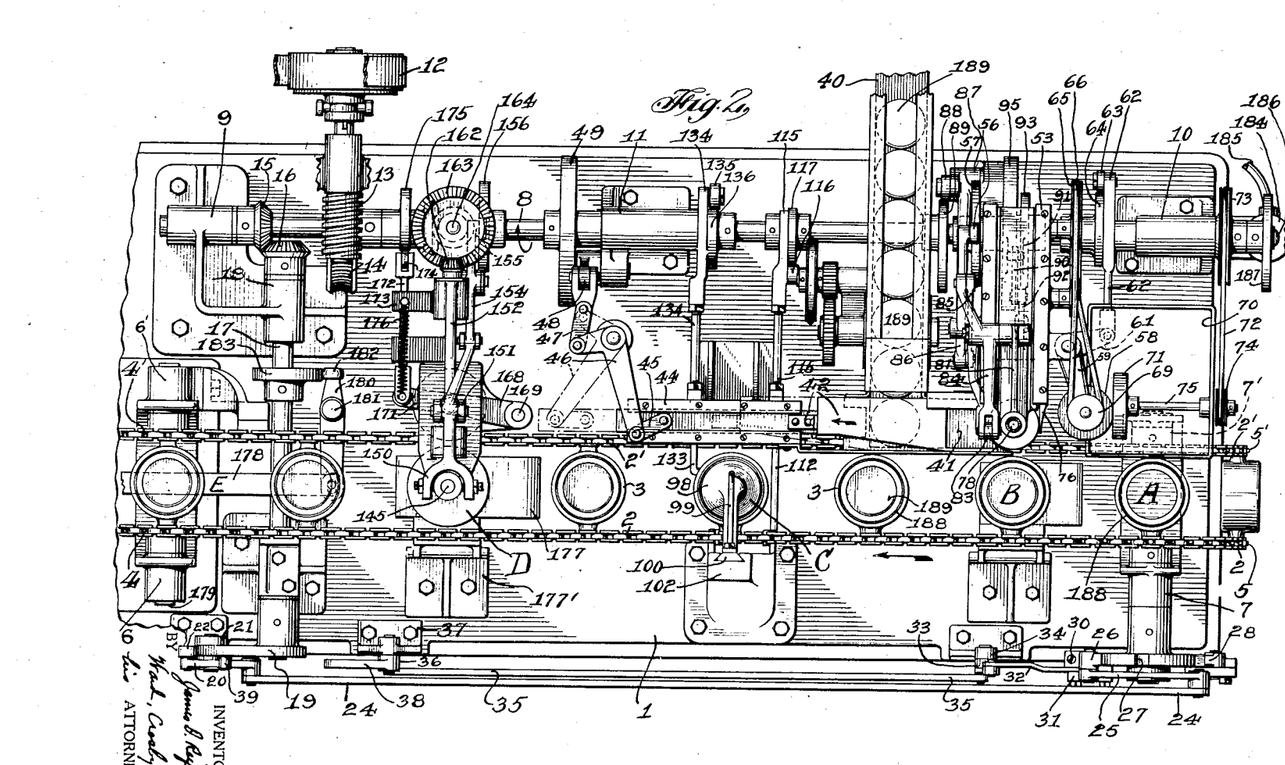
Fig. 2 is a plan view of the machine.

Referring to the drawings, and more particularly to Figs. 1 and 2:

Conveyor Means.

A suitable table or support base 1 (Fig. 2) is provided for supporting and uniting the various cooperating parts of the machine. A conveyor such as a flexible chain conveyor comprising the continuous chains 2—2' and a plurality of receptacles 3 carried therebetween, is supported at its respective extremities by the idle sprockets 4—4' and the driving sprockets 5—5' which are carried respectively by the bearing supports 6—6' and 7—7' bolted to the base 1. The supports 7—7' are bolted to the base rigidly; while the supports 6—6' are adapted to be adjusted toward or from the supports 7—7' by means of the lugs 6ª—6ª' which are formed integral with the supports 6—6' and carry bolts 6ᵇ—6ᵇ' in threaded engagement therewith and adapted to engage the end of the base 1. This adjustment provides for the necessary take-up to permit the chains to be kept taut.

A power shaft 8 (Fig. 2) extends the length of the base 1 parallel to the conveyor chains 2—2' and is supported by the end bearings 9 and 10 and the intermediate bearing 11 which are bolted to the base 1. The power shaft 8 is driven by any suitable motive means (not shown) connected to the power shaft by means of a suitable clutch such as 12 which carries a worm 13 attached to its driven part and which is in cooperative engagement with a worm wheel 14 pinned to the power shaft 8.

The power shaft 8 carries pinned thereto a bevel gear 15 in cooperative driving engagement with a gear 16 pinned to a shaft 17 supported in a bearing 18, formed integral with the bearing 9, and to which is pinned the cam 19 (Fig. 1) adapted to drive the container conveyor in the following manner: A cam arm 20, pivotally supported on a bracket 21 bolted to the base 1, carries at its upwardly extending end a cam roller 22 adapted to ride on the face of the cam 19 and held in intimate contact therewith by means of a tension coil spring 23 which is connected at one end to the base 1 and at the other end to the downwardly extending end of the arm 20. A link 24 connects the lower end of arm 20 to a pawl arm 25 pivotally mounted on the axle of the driving sprockets 5—5'. This pawl arm carries on its opposite end a pawl 26 adapted to engage one of the projecting lugs 27 which are attached to the sprocket 5. It will therefore be seen that as the power shaft 8 is rotated the cam 19 will be rotated and an oscillatory motion given to the arm 20 which will be imparted, through the link 24, to the pawl arm 25; which will move the pawl 26 to rotate the sprocket 5 in an anticlockwise direction as viewed in (Fig. 1). A trip stop 28 is provided for engaging one of the lugs 27 to prevent the sprocket from moving in a reverse direction at the end of its forward movement. This trip stop 28 is pivotally supported from the base 1 and is resiliently held in active position by means of a tension coil spring 29. A lock stop 30 provided with an adjustable head is pivoted on a bracket 31 secured to the base 1. This lock stop is adapted to engage the lug 27 which has just previously been engaged by the pawl 26, and thereby locks the sprocket and hence in cooperation with the trip stop 28 positively holds the sprockets 5—5' and hence the conveyor chains and receptacles 3 in a fixed position. This lock stop is operated in the following manner: A link 32 connects the stop 30 to the upper end of an arm 33 pivoted at its mid-point to a support 34 and connected at its lower end to one end of a link 35 which is pivoted at its other end to a bell crank 36 pivotally supported by the bracket 37. End 38 of the bell crank 36 is in alignment with a trip pin 39 carried on the side of cam 19 and so positioned that the pin 39 will trip the bell crank 36 and operate the lock trip 30 just before the cam 19 has moved the sprocket 5 to its maximum position for that particular cycle.

Figure 5:
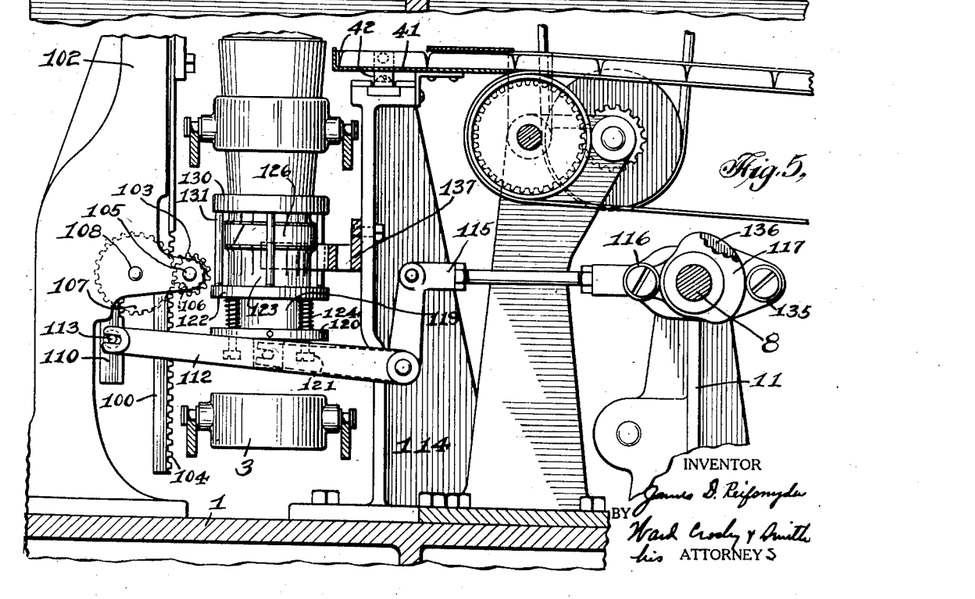
Fig. 5 is a section taken at 5—5 of Fig. 2.

The container ends are fed to the machine by any suitable means, such as for example as the conveyor belt 40 (Fig. 2), and are received by the table 41 (see also Fig. 5). They are successively fed forward one at a time, as needed, by means of a shoe 42 carried by a slide 43 (Fig. 6) carried in a guideway 44 and operated through a link mechanism (Fig. 2) including a link 45, bell crank 46, and link 47 which is attached to a cam arm 48 which carries a cam roller 48' (Fig. 6) operated by the internal cam 49 which is pinned to the power shaft 8 and so formed and positioned that a container end will be moved forward in proper synchronism with the other units of the machine, as will be more apparent from the description following.

*Adhesive applying means.*

A platen 50 (Fig. 3) is located adjacent the end of the table 41 and is carried on the rod 51 which is vertically movable in the bearings 52, formed as a part of the bracket 53, by means of the cam arm 54 pivoted at 55 and carrying at its other end a cam roller 56 adapted to engage a cam 57 pinned to the power shaft 8, and so formed and positioned that it will raise the platen 50 up and down in proper synchronism with the other units of the machine.

Figures 3, 4:
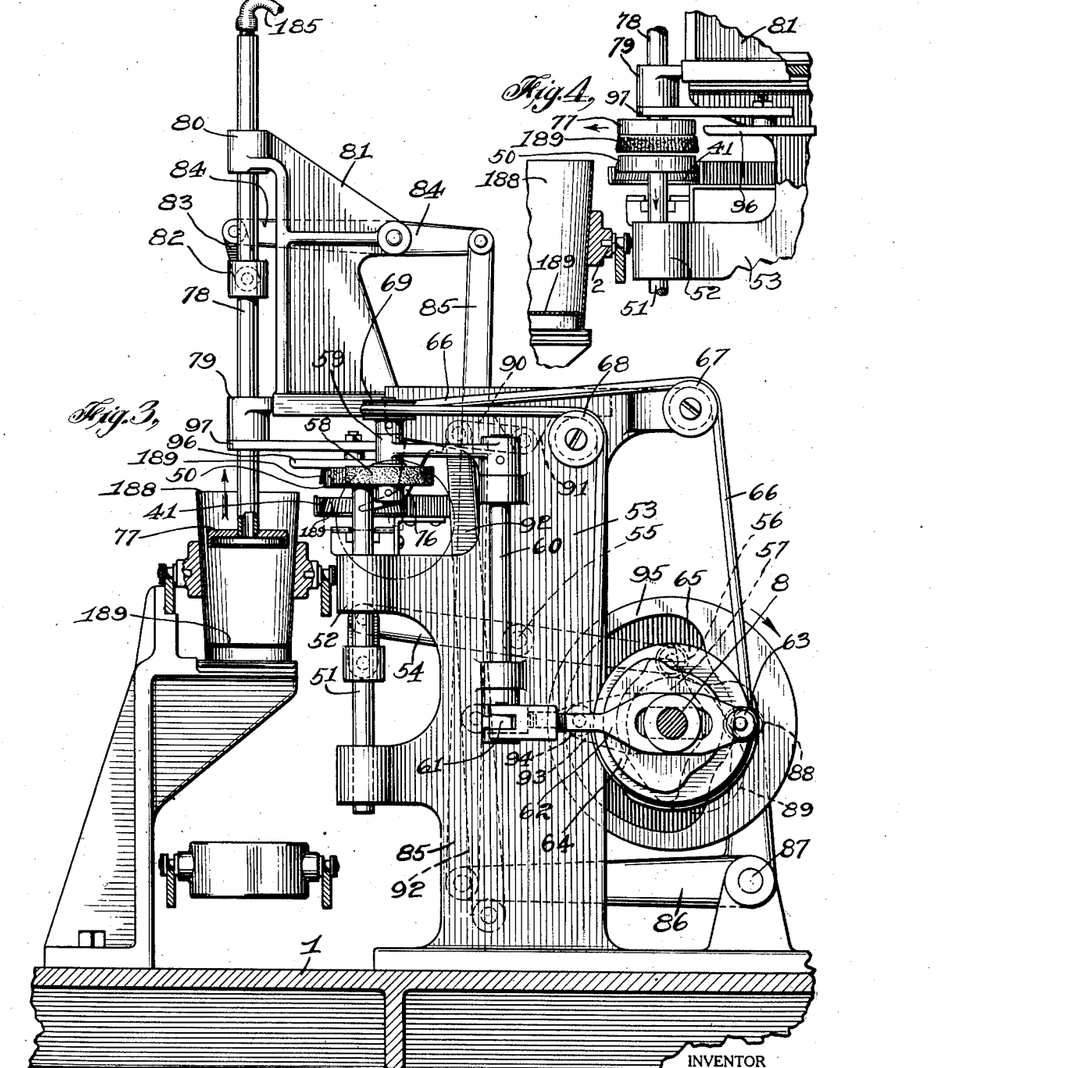
Fig. 3 is a section taken at 3—3 of Fig. 1.
Fig. 4 is a detail showing various parts of Fig. 3 in different positions.

An adhesive applying roller 58 (see also Fig. 2) is rotatively supported in a bearing 59 which is oscillatable about the axis of a shaft 60 (Fig. 3 and which is oscillated by means of the arm 61 and cam arm yoke 62 carrying a cam roller 63 adapted to ride on a cam 64 pinned to the power shaft 8; the cam being so shaped and positioned that as the platen 50 reaches it maximum position the adhesive applying roller will be moved toward it. The rollers 58 is driven from the power shaft 8 by means of a pulley 65 attached to the power shaft carrying a belt 66 passing over idlers 67—68 and engaging the driven pulley 69 connected to the adhesive applying roller 50, so that this roller is continuously driven.

An adhesive pan 70 (Fig. 2) is provided for containing adhesive, and an adhesive supply roller 71 is mounted to dip into the adhesive contained therein. The supply roller is mounted in suitable bearings and is continuously rotated by means of a belt 72 engaging the driving pulley 73 pinned to the power shaft 8 and the driven pulley 74 pinned to the roller shaft 75. The supply roller 71 is so positioned with respect to the adhesive applying roller 58 that the adhesive applying roller 58 will be moved into contact therewith on its backward oscillation and into contact with a container end on its forward oscillation. A stop finger 76 is provided for properly positioning a container end in registration with the platen 50 and is supported on the bracket 53.

End inserting means.

The end inserting means includes a suction plunger 77 (Figs. 3 and 4) adapted for vertical and horizontal movement and constructed and operated as follows: The plunger 77 is mounted for vertical movement in the bearings 79—80 formed as a part of the horizontally movable block 81. A collar 82 is pinned to the hollow shaft 78 and pivotally connected thereto is a link 83 the other end of which is pivotally connected to one end of a walking beam 84 fulcrumed at its intermediate point to the block 81 and having its other end pivotally connected to the upper end of a pitman 85, the lower end of which is pivotally connected to one end of a bell crank 86 pivoted at 87; and the other end of the bell crank carries a cam roller 88 adapted to ride on a cam 89 pinned to the power shaft 8 and so formed and positioned that the plunger 77 will be operated in synchronism with the other units of the machine.

The block 81 carrying the plunger 77 is slidably mounted in the bracket 53 in a suitable horizontal guideway and is operated in the following manner. A link 90 (Fig. 3) is pivotally connected at one end to a lug 91 dependent from the block 81 and its other end is pivotally connected to the upper end of a lever 92 whose lower end is pivotally mounted on a portion of the bracket 53. To the midpoint of the lever 92 one end of the cam yoke 93 is pivotally connected. This cam yoke (see also Fig. 2) straddles the shaft 8 and carries a cam roller 94 which is adapted to engage the internal cam 95 so formed and positioned that the block 81 and the plunger 77 carried thereby will operate in proper timed relation with the units of the machine.

In order to properly hold the container end in position to be received by the suction plunger 77 when it has reached its upward and backward position, as shown in Fig. 4, a shoe 96 is provided. This shoe is supported by a bar 97 attached to a portion of the block 81 such for example as the bearing 79. The lower side of this shoe is flush with the lower side of the plunger 77 when the plunger is in its uppermost position.

End fixing means.

The end fixing means comprises two plungers, one of which is expansible, movable relatively toward and away from each other, and other cooperating and operating parts now to be described more fully. The top plunger 98 (Fig. 6) is, in the present embodiment, the one adapted to act as the anvil; and is attached, by means of the arm 99, to a gear rack 100 which is slidably mounted in a vertical guideway 101 formed in the standard 102 (see also Fig. 7).

This gear rack 100 is moved by means of a pinion gear 103 adapted to engage the teeth 104 on the rack 100. The gear 103 is pinned to the shaft 105 which is journaled in the standard 102 and carries also pinned thereto a spur gear 106 in mesh with a cooperating spur gear 107 pinned to a shaft 108 journaled in the standard 102 and also having pinned thereto a driving spur gear 109 which is driven by means of a gear rack 110 slidably mounted in a guideway 111 (Fig. 7) formed in the standard 102. The gear rack 110 is connected to one end of a bell crank 112 by suitable means such as a stud 113 which has one end fastened to the rack and the other end in engagement with the bifurcated end of the bell crank 112. The bell crank is fulcrumed on the bracket 114 at its intermediate point and its other end is pivotally connected to one end of a cam yoke 115 which is provided with a slot at its other end in straddling engagement with the power shaft 8 and carries a cam roller 116 adapted to engage the cam 117 which is pinned to the shaft 8 and so formed and positioned that the anvil plunger 98 will operate in timed relation with the other units of the machine.

The expansible plunger, which in this embodiment is the lower plunger, will be designated in its entirety as 118. This plunger 118 is constructed in its preferred form as follows: The body of the plunger 119 (Figs. 5 and 6) is provided at its lower end with a flange 120 rigid therewith. This flange is drilled to accommodate in sliding engagement therewith, four machine screws 121 whose upper ends are in threaded engagement with the flange 122 of the cylindrical member 123; and helical compression springs 124 surround these screws and are in abutting engagement between the flanges 120 and 122 to normally resiliently hold them apart. The cylindrical member 123 is adapted to freely slide axially of the plunger body 119 against the action of the springs 124 and is provided with a plurality of slots 125 (see also Fig. 7) extending from the upper end of the cylinder a substantial distance sufficient to allow the upper end of the cylinder to be expanded. This cylinder is made of a resilient material preferably such for example as spring bronze. A split spring ring, or other elastic member such as 126 surrounds the cylinder transversely of the slots 125 and is seated in a groove or channel formed in the periphery of the cylinder. This elastic ring positively holds the segments of the cylinder normally contracted. The upper end of the cylinder 123 is provided with an interior frusto-conical bore as at 127. The upper extremity of the cylinder is formed as at 128 to fit the interior recess in the lower side of the container end, as is clearly indicated in Fig. 6, and normally is of a smaller diameter than the diameter of the recess. The upper end of the plunger body 119 is provided with a frusto-conical expanding portion 129 which is made rigid with the plunger body 119. A ring 130 is held in spaced relation surrounding the end 128 of the cylinder 123 by means of the spacing studs 131 with ends in threaded engagement respectively with the ring 130 and the flange 122 of the cylinder 123. The interior of the ring 130 is formed to fit the exterior of the lower extremity of the container body.

Figure 6:
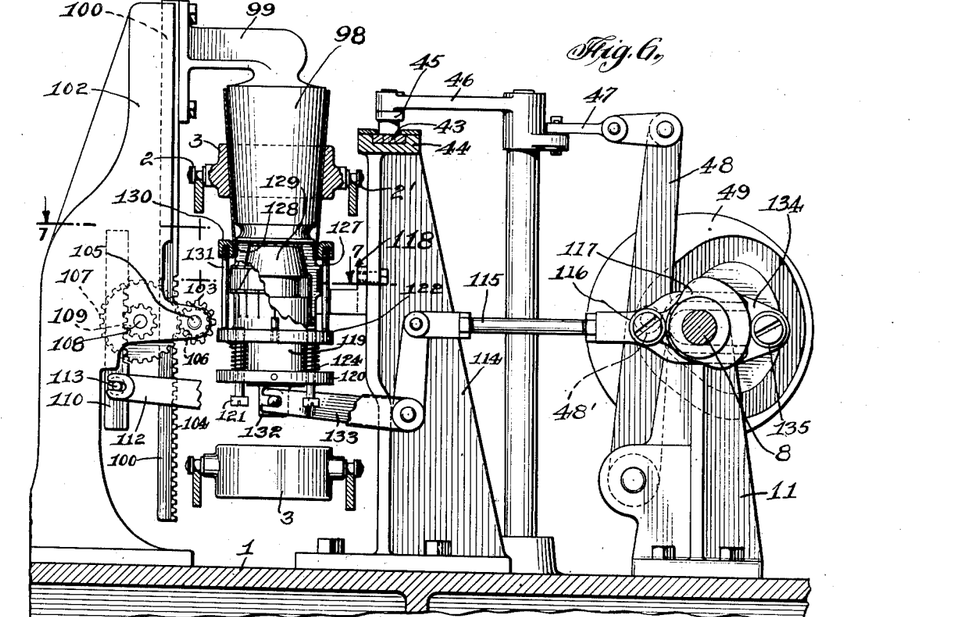
Fig. 6 is a section taken at 6—6 of Fig. 1.

A lug 132, dependent from the lower end of the plunger body 119 is pivotally connected to a bell crank 133 pivoted at its intermediate point to the bracket 114 and connected at its other end to a cam lever 134 (Fig. 2) provided with a bifurcated end in straddling engagement with the power shaft 8 and carrying a cam roller 135 adapted to ride on a cam 136 substantially identical with the cam 117 and so formed and positioned that the plunger 118 will be operated in proper timed relation with other units of the machine. The plunger 118 is restrained to a vertical movement by means of a suitable guideway support such as 137 attached to the bracket 114 (Figs. 7, 5 and 6).

Modification of Expansible Plunger.

Figures 7, 8:
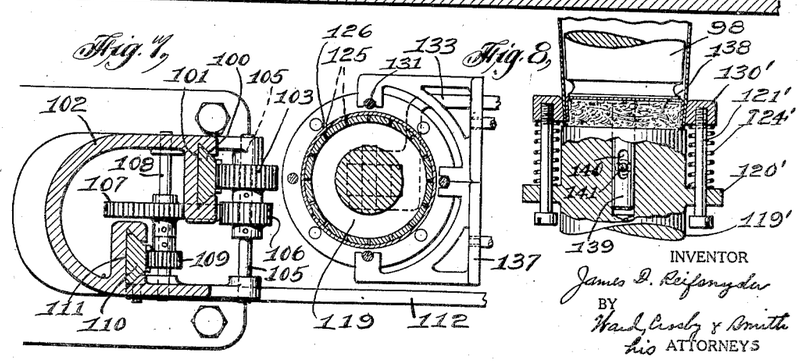
Fig. 7 is a section taken at 7—7 of Fig. 6.
Fig. 8 is a modification of the expansible plunger.

Instead of making the plunger 118 as above described I have found that another form of suitable expansible plunger may be made as shown in Fig. 8. In this form parts similar to parts of the preferred plunger will be designated with the same numerals with the addition of the suffix prime ('). The material difference between the two forms is that in this modification a resilent rubber member 138 is used instead of the cylindrical member 123 with a resilient end and such parts forming necessary parts thereof. Here the rubber head 138 is attached to the plunger body 119' by means of a pin 139 provided with a slot 140 into which extends a pin 141 secured to the plunger body 119'. The pin 139 is provided with a head embedded in the rubber, and the pin is slidably mounted in the body 119' so that the rubber head 138 is movable axially of and relative to the body 119'.

Bead Forming Means.

Figure 9:
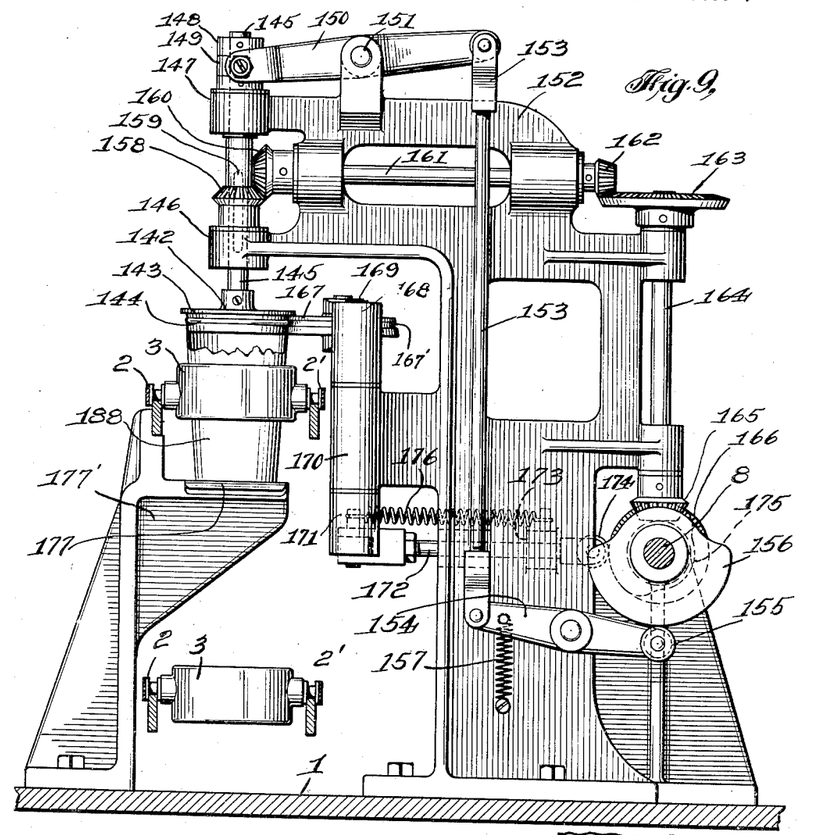
Fig. 9 is a section taken at 9—9 of Fig. 1.

Referring to Figs. 1 and 2, and more particularly to Fig. 9, a bead roller 142 provided with a top flange 143 and a peripheral bead 144 is attached to a vertical driving shaft 145 which is slidably mounted in the bearings 146 and 147 and supported on the upper bearing 147 by means of a collar 148 pinned to the shaft 145 and seated on a washer which rests on the bearing 147. The collar 148 is provided with a groove into which is seated a yoke ring 149 to which is pivotally connected the bifurcated end of a walking beam 150 fulcrumed at its intermediate point to bearing 151 formed as a part of the support 152; and the other end of the walking beam is pivotally connected to the upper end of a pitman 153 whose lower end is pivotally connected to one end of a cam arm 154 pivoted at its intermediate point to the support 152 and carrying at its other end a cam roller 155 adapted to ride on a cam 156 pinned to the power shaft 8 and so formed and positioned that the bead roller 142 will be raised and lowered in proper timed relation with the other units of the machine. A helical tension spring 157 serves to hold the roller 155 in engagement with the periphery of the cam 156.

A bevel gear 158 is splined on the shaft 145 slidable relatively thereto and rotatively attached thereto by suitable means such as a Woodruff key seated in the slot 159. This gear is supported vertically by the bearing 146 and a suitable thrust washer is interposed between the gear and its seat, the bearing 146. A cooperating bevel gear 160 is in mesh with the gear 158 and is pinned to the shaft 161 which is journaled in suitable bearings formed in the support 152; and carries pinned to its other end a bevel gear 162 which is in mesh with a cooperating bevel gear 163 pinned to the upper end of a vertical shaft 164 journaled in suitable bearings formed in the support 152. A bevel gear 165 is pinned to the lower end of the shaft 164 and is in mesh with a cooperating bevel gear 166 which is pinned to the power shaft 8. It will therefore be seen that the bead roller 143 is continuously rotated by means of the mechanism above described. A bead roller 167, provided with a groove 167' adapted to cooperate with the bead 144 of the bead roller 142, (Fig. 9) is rotatively mounted on one end of a bifurcated lever 168 (see also Fig. 2), the other end of which is pinned to an axle 169 which is journaled in a suitable bearing such as 170 formed as a part of the support 152 and is free to oscillate therein. The lower end of the axle 169 carries pinned thereto one end of a lever 171 whose other end is pivotally connected to one bifurcated end of a cam arm 172, slidably supported in a bearing 173 formed as a part of the support 152, and whose other end carries a cam roller 174 adapted to ride on a cam 175 which is pinned to the power shaft 8 and so formed and positioned that the bead roller 167 is moved toward and into cooperative relation to the bead roller 142 in proper timed relation with the other units of the machine. A helical tension spring 176 is provided for keeping the cam roller 174 seated on the periphery of the cam 175.

A plate 177 provided with a downwardly extending front portion is carried on a bracket 177' which is bolted to the base 1. This plate is positioned beneath the bead roller 142 and serves to positively position the containers in the proper vertical position to be operated upon by the bead rolling mechanism.

Ejecting mechanism.

Referring to Figs. 1 and 2: a bifurcated ejecting plunger 178 is horizontally slidably mounted on the axle 179 of the sprockets 4—4' and is positioned axially of the receptacle 3 when the same is at the ejecting station. One end of the ejecting plunger 178 is pivotally connected to a lever arm 180 which is pivotally mounted on a support 181 (Fig. 2) bolted to the base 1 and the other end carries a cam roller 182 adapted to ride on the cam 183 which is pinned to the transverse shaft 17 and so formed and positioned that the ejector is operated in proper timed relation with the other units of the machine.

Vacuum means.

Referring more particularly to Fig. 1, and also to Fig. 4: a valve 184, connected to any suitable suction means such as a vacuum pump (not shown), is mounted on the end of the base 1 with its inlet side connected to one end of a tube 185, whose other end is connected to the hollow shaft 78, and is provided with an operating plunger 186 adapted to engage the periphery of a cam 187 pinned to the power shaft 8 and so formed and positioned that the valve will be opened and closed to apply a suction to the plunger head 77 in proper timed relation to the other units of the machine.

Operation. Adhesive applying.

The machine is started, by means of throwing in the clutch 12 (Fig. 2), which thereby connects the mechanism to the source of motive power; and the vacuum pump (not shown) is started to furnish suction to the valve 185 which, at proper intervals, controls the suction applied at the plunger 77. The machine having been started, the conveyor chain and the receptacles 3 carried thereby are intermittently moved in the direction as indicated by the arrow in Fig. 2.

The container bodies 188 (Fig. 2) are fed to the receptacles 3 by any suitable means, in the present embodiment they are fed to the receptacles as the receptacles respectively pass over the sprockets 5—5' which position will be termed as station —A—. The container ends 189 are fed to the table 41 by any suitable means, such for example by a delivery belt conveyor, as is well understood in the art.

As a container end is fed to the table 41 (Fig. 2) the shoe 42 is moved forward and pushes a preceding end over the platen 50 (Fig. 3) when the platen is in its downward position, indicated in Fig. 3 by dotted lines. The stop finger 76 positively positions the end over the platen. The platen is now raised vertically until it comes into horizontal alignment with the adhesive applying roller 58, and into abutting engagement with the shoe 96, at which time the roller 58 is oscillated about its axis 60 and is brought into peripheral frictional driving contact with the downturned flange of the end 189 to thereby apply adhesive thereto as the end is rotated by the roller (see also Fig. 2). As soon as this is completed the roller 58 moves back into contact with the supply roller 71 to acquire a new coating of adhesive.

End inserting.

At this time the plunger 77 is in a position directly over the platen 50 and is moving downward. As soon as the plunger 77 comes into contact with the upper face of the end 189 the valve 184 (Fig. 1) is opened thereby applying suction to the plunger 77 which firmly holds the end against the plunger. The plunger 77 is now slightly raised and the platen 50 is started on its downward movement at the same time as the plunger 77—carrying the end 189—is started in its movement to the left as indicated more particularly in Fig. 4. The plunger continues to move to the left, carried by the slide block 81, until it comes into vertical axial alignment with the body 188 which has now been moved to a position designated in Figs. 1 and 2 as —B—. At this time the plunger is moved downwardly carrying the end down to its proper position at the bottom of the body 188. The suction is now cut off, by means of the valve 188 operated by the cam 187, and the plunger is withdrawn vertically from the container and is returned horizontally to its position over the platen 50 to receive the next container end.

End fixing.

The conveyor chains are now moved forward one step further and the body 188 brought to rest at a position which will be designated as station C (Fig. 1). At this time the upper plunger 98 is at the top of its stroke, as shown in Fig. 1, and the lower plunger 118 is at the lowermost position of its downward stroke. The plungers are now moved toward each other simultaneously (Fig. 6), with the top or anvil plunger a little in advance of the lower or expansible plunger, so that the anvil plunger will seat against the top of the container end before the expansible plunger contacts with the under side of the container end. We will consider that the anvil plunger 98 has been seated and the expansible plunger is still moving up.

The upper end 128 of the expansible cylinder 123, resiliently supported by the springs 124 from the flange 120, is moved into the cup-like recess in the under side of the container end until it is arrested in its upward movement by the anvil plunger 98; and at this time the ring 130 surrounds the lower end of the container. It will be seen that the contiguous peripheral portions of the container body and the container end are now positioned in the annular space between the ring 130 and the end 128 of the expansible cylinder 123. As the plunger body 119 continues to move upward the springs 124 are compressed and the frusto-conical end 129 is seated in the cooperating bore 127 thereby expanding the cylinder end 128. This radially presses the juxtaposed peripheral portions of the container body and the container end between the ring 130 and the cylinder end 128 to thereby force these adjacent surfaces, with the adhesive therebetween, into a positive state of cohesion. The two plungers now separate until clear of the container and the receptacle conveyor moves on.

Bead forming.

The receptacle chain conveyor now comes to rest, bringing the container to a stop at a position which will be designated in Figs. 1 and 2 as station —D—; at which point the bead is formed in the following manner, with reference more particularly to Fig. 9; at the time when the container is brought to rest at station —D— it is in axial vertical alignment with the bead roller 142 which is then in a raised position; and the container is positively supported in correct position by the plate 177. At this time the roller 167 is swung away from the container. The roller 143 is moved downward and the roller 167 swung toward the container in such timed relation that the roller 143 is positioned within the mouth of the container prior to the time when the roller 167 engages the outside periphery of the container. The container is now rotated, being frictionally driven between the two rollers, so that a bead is formed on the periphery of the container at the time that the periphery is passing the point of tangency of the two rollers. When the bead has been completed the roller 167 is swung away and the roller 142 raised clear of the container. The conveyor is now moved on.

Ejecting.

When the container reaches the ejecting station, which will be designated, (Fig. 1) as —E—, the conveyor is brought to rest and the ejector 178 is operated to eject the finished container, which preferably is not entirely ejected but falls out as the receptacle passes the station —E— and is inverted beneath the sprockets 4—4'.

Having thus described my invention with particularity with reference to the preferred method of carrying out the same and in connection with the preferred apparatus for carrying out the same, it will be obvious to those skilled in the art, after understanding my invention, that other changes and modifications may be made therein without departing from the spirt and scope of my invention, and I aim in the appended claims to cover such changes and modifications as are within the scope of the invention.

What I claim is:

1. In a machine for the assembly of containers, the combination of a flexible conveyor, receptacles mounted on said conveyor adapted to hold the bodies of said containers, means for conveying the ends of said containers, means for feeding said ends forward from said end conveyor, means for receiving said ends, means for applying adhesive to said ends, means for moving said ends from said end receiving means and for positioning said ends within said container bodies, means for setting said ends in said bodies, means for ejecting said completed containers, and mechanism connected to the said various means for driving them in a predetermined timed relation one with respect to the other.

2. In a machine for the assembly of containers, the combination of means for holding the bodies of said containers, means for feeding the ends of said containers to an adhesive applying device, means for applying adhesive to said ends, and means for inserting said ends in said container bodies after adhesive has been applied to said ends.

3. In a machine for the assembly of containers, the combination of means for holding the bodies of said containers, means for feeding the flanged ends of said containers to an end inserting means, means for inserting said flanged ends in said container bodies, and means for fixing said ends in said bodies comprising a vertically movable expansible plunger adapted to engage the inner wall of the flange of said end and to radially press said flange outwardly against said container body, and a cooperating anvil plunger.

4. In a machine for the assembly of containers, the combination of means for holding the bodies of said containers, means for feeding the flanged ends of said containers to an end inserting means, means for applying adhesive to the flange of said end, means for inserting said flanged ends in said container bodies after adhesive has been applied thereto and while said bodies are held in said body holding means, and means for fixing said ends in said bodies comprising a vertically movable expansible plunger and a cooperating anvil plunger, said expansible plunger being adapted to engage the inner periphery of the flange of said end to press it radially outwardly to thereby press the juxtaposed peripheral portions of said flange and body into positive cohesion.

5. In a machine for the assembly of containers, the combination of means for holding the bodies of said containers, means for feeding the flanged ends of said containers to an end inserting means, means for applying adhesive to the flange of said end, means for inserting said ends in said container bodies after adhesive has been applied thereto and while said bodies are held in said body holding means, means for fixing said ends in said bodies comprising a vertically movable expansible plunger and a cooperating anvil plunger, said expansible plunger being adapted to engage the inner periphery of the flange of said end to press it radially outwardly to thereby press the juxtaposed peripheral portions of said flange and body into positive cohesion, and means for intermittently moving each of said bodies respectively, into cooperating position successively with said end inserting means and said fixing means, in timed relation therewith.

6. In a machine for the assembly of containers, the combination of means for holding the bodies of said containers, means for feeding the ends of said containers to an end inserting means, means for inserting said ends in said container bodies, and means for fixing said ends in said bodies comprising two cooperating plunger members relatively movable toward each other and one of which is expansible, and a ring surrounding the expansible plunger adjacent one end thereof in cooperative spaced relation thereto to thereby limit the expansion of said expansible plunger.

7. In a machine for the assembly of containers from formed parts, the combination of means for holding a container body, a vertically movable member for raising a container end to the level of an adhesive applying means, a vertically pivoted rotatable adhesive applying means adapted to engage said end while in a raised position to apply adhesive thereto, and means for positioning said end portion within said body portion after said application of adhesive.

8. In a machine for the assembly of containers from formed parts, the combination of means for holding a container body, a vertically movable member for raising a container end to the level of an adhesive applying means mounted for oscillation in a horizontal plane to thereby bring it into engagement with the periphery of said end portion to apply adhesive thereto, and means for positioning said end portion within said body portion.

9. In a machine for the assembly of containers from formed parts, the combination of means for holding a container body, a horizontally movable member for feeding a container end toward an adhesive applying means, a vertically movable member for raising said container end to the level of an adhesive applying means, a vertically pivoted rotatable adhesive applying device adapted to engage said end while in a raised position to apply adhesive thereto, and means for positioning said end portion within said body portion after said application of adhesive.

10. In a machine for the assembly of containers from formed parts, the combination of a longitudinally movable receptacle conveyor means adapted to hold container bodies, a conveyor means extending transversely thereto adapted to feed container ends toward said bodies, vertically movable means for raising one of said container ends, adhesive applying means adapted to be oscillated into contact with said end for applying adhesive to said end, and a positioning plunger movable vertically and horizontally for placing said end in one of said containers.

11. In a machine for the assembly of containers, the combination of two plungers relatively movable alternately toward and away from each other, one of said plungers comprising a radially expansible member associated with cooperating means to expand said expansible member and a ring surrounding said expansible member in spaced cooperating relation thereto to thereby limit the expansion of said member.

12. In a machine for the assembly of containers, the combination of two plungers relatively movable alternately toward and away from each other, one of said plungers comprising a hollow cylindrical member provided with a plurality of longitudinal slots extending from one end toward the other end for a considerable portion of the length of said cylinder and associated cooperating expanding means adapted to expand said slotted end of said cylinder, and a ring surrounding said expansible member in spaced relation thereto to thereby limit the expansion of said expansible member.

13. In a machine for the assembly of containers, the combination of two plungers relatively movable alternately toward and away from each other, one of said plungers comprising a hollow cylindrical member provided with an internal frustro-conical bore adjacent one end and a plurality of slots extending from this end to a point beyond said frustro-conical bore to thereby permit said slotted end to be expanded and a cooperating frustro-conical member adapted to move against said bore to thereby expand said end, and means surrounding said end to limit the expansion thereof.

14. In a machine for the assembly of containers each comprising a body portion and an end portion provided with a bottom part and a skirt adapted to fit a contiguous part of said body portion, the combination of an expansible member of a smaller normal diameter than the diameter of said end portion, a ring of greater diameter than the diameter of and surrounding said expansible member and spaced in such cooperative relation thereto that an annular space is formed between said ring and said expansible member adapted to receive the contiguous parts of said end and body portions, and means to expand said expansible member to thereby press said contiguous parts between said expansible member and said ring to fix said contiguous parts in more intimate contact.

15. In a machine for the assembly of containers each comprising a body portion and an end portion provided with a bottom part and a skirt adapted to fit a contiguous part of said body portion, the combination of a vertically movable expansible member of a smaller normal diameter than the diameter of said end portion, a ring of greater diameter than the diameter of and surrounding said expansible member and spaced in such cooperative relation thereto that an annular space is formed between said ring and said expansible member adapted to receive the contiguous parts of said end and body portions, means to expand said expansible member to thereby press said contiguous parts between said expansible member and said ring to fix said contiguous parts in more intimate contact, and means cooperating with said expansible member to limit its vertical movement In testimony whereof I have signed my name to this specification.

JAMES D. REIFSNYDER.